UNITED STATES PATENT OFFICE.

WILLIAM EDGAR MUNTZ, OF LONDON, ENGLAND.

CONSTRUCTION OF THE COVERS OF PNEUMATIC TIRES.

1,184,257. Specification of Letters Patent. Patented May 23, 1916.

No Drawing. Application filed July 3, 1913. Serial No. 777,353.

*To all whom it may concern:*

Be it known that I, WILLIAM EDGAR MUNTZ, a subject of the King of Great Britain, and resident of the Royal Automobile Club, 89 to 91 Pall Mall, London, England, late of His Majesty's Public Works Department, India, have invented new and useful Improvements in and Relating to the Construction of the Covers of Pneumatic Tires, of which the following is a specification.

The covers of pneumatic tires are made of several plies of canvas cemented together and covered where necessary with wear resisting material to withstand the friction of the road. To keep the wet from the canvas and to prevent it from rotting, a coating of waterproofing material, generally india rubber, is commonly employed, and it has been suggested that the canvas, previous to being rubbered, shall be impregnated with compositions of various descriptions to render it waterproof, and in one instance rotproof. This treatment however has been found not to be compatible with the vulcanization, which is necessary when cemented layers of canvas are used, or when rubber in the cover in any form requires to be vulcanized, owing to the fact that the materials suggested are liable to mix with the rubber of the tire, rendering it "tacky" while the canvas loses more or less its rotproof properties.

The object of my invention is to provide a rotproof foundation for tire covers while retaining rubber as a cementing material, as a tread, as beads or in any other capacity. The tread need not necessarily be of rubber. Any other convenient flexible material, such as leather, may be used, but in every case there will be rubber for cementing purposes which will require vulcanization to render safe the attachment of the cemented parts.

According to my invention the canvas is treated in such a manner that it becomes permanently rotproof, and the material employed for rotproofing does not mix with or soften the rubber either during vulcanization or running. This provides that the canvas, even if exposed to wet by wear or damage of the rubber coating, will still be preserved from rotting, which is not the case at present.

Creosoted wood tar oil suggested for rendering canvas rotproof and the wax and resins proposed for rendering canvas waterproof are easily miscible with the rubber used and are therefore unsuitable for tire manufacture owing to the rubber becoming softened or tacky and the canvas losing its rotproof or waterproof properties during vulcanization or running.

The treatment which I employ provides either a rotproof surface to the canvas or transforms the fabric into a rotproof material, the rotproofing material employed in both cases being quite insoluble and inert as regards rubber. This treatment which I employ may consist in impregnating the fabric with cellulose acetate by applying a solution of cellulose acetate in acetone, trichlorethylene, or other suitable volatile solvent. Instead of cellulose acetate I may employ other esters of cellulose in solution, avoiding the use of cellulose nitrate for temperatures exceeding about 220° F. Or the fabric may be treated with an acetylating or formylating bath to convert (but not to dissolve) the cellulose partly or entirely into cellulose acetate or formate or a mixture of these, preferably employing a low temperature for the conversion of the cellulose. I may here remark that treating cellulose, yarn or woven fabrics with an acetylating bath is not in itself new and I make no claim to such treatment generally. I may, if desired, line the treated canvas backing with ordinary fabric to provide a smooth innermost wall, such as of Egyptian cotton or other similar fabric, for the air tube, so as to prevent undue friction within the tire. In this case the ordinary fabric lining may be stitched to the treated canvas and leather or other skin at the same time, or it may be subsequently secured thereto by any convenient means.

I wish it to be understood that in my improved tire-cover the rubber used is not for the purpose of excluding water from the interior of the cover, and that the essential feature of the invention is the use of canvas for the cover which has been made rotproof in the manner above explained. This rotproof canvas lining may be made in as many layers as desired. The wearing portion of the cover may also be formed of a plurality of layers; if desired the outermost layer, forming the tread proper, may be cemented or similarly secured upon the under layer and in this way the stitches, where sewing is used, need not pass through the whole thickness of the tread.

What I claim and desire to secure by Letters Patent of the United States is:—

A tire comprising fabric and rubber, the said fabric being impregnated with esters of cellulose, whereby it is rendered rot-proof.

WILLIAM EDGAR MUNTZ.

Witnesses:
S. A. NEWTON,
J. PHILLIPS CRAWLEY.